United States Patent [19]
Metroka et al.

[11] Patent Number: 5,187,640
[45] Date of Patent: Feb. 16, 1993

[54] CAPACITIVE POWER SUPPLY

[75] Inventors: Michael P. Metroka, Algonquin; Rolland R. Hackbart, Buffalo Grove, both of Ill.

[73] Assignee: Motorola, Inc., Schaumburg, Ill.

[21] Appl. No.: 596,253

[22] Filed: Oct. 12, 1990

[51] Int. Cl.$^5$ .......................... H01G 1/08; H01G 9/00; G08B 5/22

[52] U.S. Cl. .................................. 361/329; 361/503; 340/825.44

[58] Field of Search ................ 361/320, 321, 502, 503, 361/522–525, 541, 328, 329; 340/825.44

[56] References Cited

U.S. PATENT DOCUMENTS

| | | | |
|---|---|---|---|
| 2,552,653 | 5/1951 | Stupakoff | 361/321 |
| 2,841,508 | 7/1958 | Roup et al. | 117/200 |
| 3,883,784 | 5/1975 | Peck et al. | 361/323 X |
| 4,872,086 | 10/1989 | Huang et al. | 361/321 |
| 4,878,150 | 10/1989 | Rounds | 361/323 X |
| 5,063,340 | 11/1991 | Kalenowsky | 320/1 |
| 5,075,281 | 12/1991 | Testardi | 361/311 X |
| 5,095,308 | 3/1992 | Hewitt | 340/825.44 |

FOREIGN PATENT DOCUMENTS 1196683 11/1985 Canada.
1270296 6/1990 Canada.

OTHER PUBLICATIONS

IEEE Transactions on Magnetics vol. 25 No. 1 Jan. 1989 pp. 324–330.
IEEE Transactions on Magnetics vol. 25 No. 1 Jan. 1989 pp. 102–106.

Primary Examiner—Donald A. Griffin
Attorney, Agent, or Firm—Robert H. Kelly

[57] ABSTRACT

A capacitive power supply for powering a portable electrical device, such as a radiotelephone. The capacitive power supply is comprised of capacitors stacked vertically in a series connection of capacitive values capable of generating currents of levels great enough to power a radiotelephone for an extended period of time.

15 Claims, 4 Drawing Sheets

CAPACITIVE POWER SUPPLY

BACKGROUND OF THE INVENTION

The present invention relates generally to power supplies, and, more particularly, to a portable, capacitive power supply for powering a load element, such as a portable radiotelephone.

Portable power supplies are utilized to power many varied electrical devices. In many instances, the use of such a portable power supply to power an electrical device is necessitated in instances in which the electrical device cannot be positioned proximate to a permanent power supply to be supplied power therefrom. In other instances, the use of a portable power supply to power an electrical device is advantageous as the portable power supply enhances the portability of the electrical device. A portable power supply may be positioned proximate to the electrical device, or carried with, or within, the electrical device. The electrical device need not be positioned proximate to a permanent power supply to permit operation of the electrical device, and power cables connecting the electrical device with the permanent power supply are not required.

Conventionally, portable power supplies are comprised of electrochemical materials. Energy is stored in the electrochemical material in the form of chemical energy, and, conversion of the chemical energy into electrical energy caused by reaction of the electrochemical material, provides the power to power the electrical device thereby.

Such conventional, portable power supplies are generically referred to as batteries, and are widely popular both for reasons of availability, convenience, and initial purchase price. A battery, however, (as is also true with other types of portable power sources), is of a limited energy storage capacity. When a battery is coupled to an electrical device and utilized to power the electrical device thereby, the stored energy contained in the battery is converted into electrical energy and discharged therefrom.

After an extended period of use, discharge of the stored energy of the battery depletes the battery of remaining stored energy. Once the stored energy of the battery is depleted below a certain level, replacement of the battery is necessitated to permit continued operation of the electrical device. The frequency with which the battery must be replaced is, of course, dependent upon the battery capacity (i.e., the amount of energy stored in the battery), the energy required to operate the electrical device, and the frequency with which the electrical device is operated.

Nickel-cadmium (Ni-Cd) batteries have been developed and are widely used as portable power sources for the reason that a Ni-Cd battery, once depleted of stored energy, may be recharged simply by connecting the battery to a suitable charging current source for a period of time. Other battery types have similarly been developed which may be recharged once depleted of stored energy. Battery charging apparatus is also known and available to permit such recharging.

However, a rechargeable battery cannot be recharged and reused an unlimited number of times. For instance, a Ni-Cd battery may be typically recharged up to approximately five hundred times. After repeated recharging of the Ni-Cd battery, conversion of the energy of a charging current applied to the battery into stored, chemical energy of the battery is much less efficient. Eventually, efficiency of energy conversion becomes so low that the battery does not become recharged to a significant extent. Therefore, even a rechargeable battery has a limited, practical life.

Additionally, when recharging a rechargeable battery, the rate at which a charging current is applied to the battery must be controlled to prevent damage to the battery. More particularly, the charging current applied to the battery must be less than a certain, maximum level. Because the level of the charging current applied to the rechargeable battery determines the charging rate of the battery, the time required to recharge a battery cannot be reduced below a time period which is dependent upon the maximum current level that may be applied to the battery. Such a minimum time period required to recharge a rechargeable battery, can pose inconveniences. For instance, if only one rechargeable battery is available to power the electrical device, the electrical device cannot be operated prior to expiration of the time period required to recharge the battery.

Still further, when charging a rechargeable battery, such as a Ni-Cd battery, at a maximum, allowable charging rate (to minimize, thereby, the time period required to recharge the battery), application of the charging current to the battery must be terminated once the battery becomes fully charged. Overcharging of the battery at the maximum allowable charging rate can cause gassing, electrolytic venting of the battery, permanent loss of battery capacity, and physical damage to the battery.

Capacitors used to form portable power sources for low power applications are also known. For example, capacitive power sources have been utilized as backup power supplies for integrated circuit memories. Capacitors having capacitances of values great enough to generate current levels to power most electrical devices for extended periods of time, however, have heretofore been impractical for the reason that such capacitors were of significant dimensions. Other of such capacitive power sources are of very high effective resistances, and are similarly impractical for use to generate large current levels.

One electrical device which is oftentimes powered by a portable power supply is a portable transceiver, such as a radiotelephone utilized to communicate in a cellular, communication system. When powered by a portable power supply, the radiotelephone may be positioned at any location throughout a geographical area encompassed by the cellular, communication system.

Operation of the radiotelephone, however, typically requires powering of the radiotelephone at a power of up to three watts. Such a power requirement requires a relatively large battery (both is size and weight) to permit extended operation of the radiotelephone. However, to enhance the portability of the radiotelephone, the battery should be of minimal size and weight. Battery size considerations responsive to such power requirements and the design goal of size and weight minimization conflict. Existing rechargeable battery designs compromise between energy storage capacity and battery size. One commercially available, rechargeable battery is of a design which permits powering of a radiotelephone at a power level of three watts for a period of approximately one and one half hours, and is of a weight of less than six ounces.

To operate the radiotelephone for an extended period of time (i.e., beyond the time period permitted by the energy storage capacity of the battery), a radiotelephone user typically carries a spare, and freshly charged, battery in addition to the primary battery initially utilized to power the radiotelephone. Once the primary battery becomes discharged to a level preventing further operation of the radiotelephone, the battery is replaced with the spare battery to permit, thereby, continued operation of the radiotelephone.

The radiotelephone user may be required to carry more than one spare battery to further extend the period of operation of the radiotelephone if the primary battery cannot be recharged before the spare battery becomes discharged.

Even when a radiotelephone user has access to battery charging apparatus, if the time required to recharge the battery (and the battery, as mentioned hereinabove, cannot be charged at a rate in excess of a certain value) is greater than the operational time period of the radiotelephone permitted by the spare battery, an addition spare battery is required to permit continued operation of the radiotelephone.

In light of the above, it may be discerned that the use of a conventional, rechargeable, electrochemical battery as a portable power source to power a portable electrical device, such as a radiotelephone, is not problem-free. A rechargeable, electrochemical battery may be recharged only a finite number of times, and is therefore of a limited operational life. A rechargeable electrochemical battery, therefore, may not form a permanent portion of the electrical device as the battery must be discarded and replaced when the battery can no longer be recharged. Additionally, the time period required to fully recharge a discharged battery cannot be less than a minimum time period as the charging rate in which a charging current is applied to the battery cannot exceed a maximum level. Still further, a high charging current cannot be applied to the battery once the battery has been fully charged.

What is needed, therefore, is a portable power supply of substantially unlimited life, and of a construction and design which permits recharging thereof, once discharged, at a high charging rate to minimize the amount of time required to recharge the power source.

SUMMARY OF THE INVENTION

It is, accordingly, an object of the present invention to provide a portable power source which may be recharged an unlimited number of times to be thereby of a substantially unlimited life.

It is a further object of the present invention to provide a portable power source which may be recharged at a relatively high charging rate.

It is a still further object of the present invention to provide a portable power source of small dimensions.

It is a yet further object of the present invention to provide a portable power supply which may be permanently affixed to an electrical device which is to be powered thereby.

In accordance with the present invention, therefore, a portable power supply for powering an electrical load element when coupled thereto is disclosed. The portable power supply has a first surface forming an energy storage surface formed of a conductive material for collecting and storing electrical charged responsive to application of a charging current to thereto. A second surface is comprised of a conductive material and is spaced-apart from the energy storage surface formed by the first surface whereby a potential difference is formed across the first and the second surfaces when the electrical charge is applied to the energy storage surface. The first surface and the second surface spaced-apart therefrom are together of a low electrical resistance to minimize, thereby, resistive loss across the first and second surfaces during discharge of the electrical charge stored upon the energy storage surface to power the electrical load element when coupled thereto.

BRIEF DESCRIPTION OF THE DRAWINGS

The present invention will be better understood when read in light of the accompanying drawings in which.

DESCRIPTION OF A PREFERRED EMBODIMENT

Figure 1:
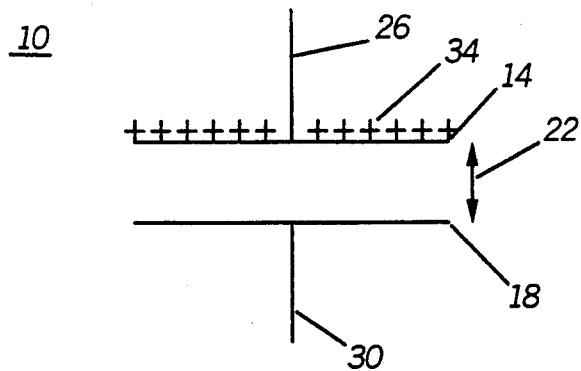
FIG. 1 is a circuit schematic of an ideal capacitive element.

Referring first to the circuit schematic of FIG. 1, an electrical designation of an ideal capacitor, referred to generally by reference numeral 10, is shown. Capacitor 10 is comprised of plates 14 and 18 having surfaces formed thereupon which are spaced-apart from one another by a distance indicated by arrow 22 in the Figure. Lead 26 is electrically coupled to plate 14, and lead 30 is electrically coupled to plate 18. Connection of opposite sides of a voltage source to the spaced-apart surfaces formed upon plates 14 and 18 causes electrical charge to be formed upon one of the plates. Positive charge indicators 34, illustrated proximate to plate 14 in the Figure, are indicative of electrical charge applied to the capacitor 10 by the voltage source. To form a positive charge upon the surface of plate 14, a positive side of the voltage source is coupled to plate 14 (such as, for example, through lead 26), and a negative side of the voltage source is coupled to plate 18 (such as, for example, through lead 30).

Application of such electrical charge to a surface formed upon one of the plates, here plate 14, forms a potential difference across the surfaces formed on the plates 14 and 18. The electrical charge, and the potential difference derived therefrom, remains even after the voltage source is removed. Capacitor 10 thereby functions as a charge (i.e., energy) storage device. It is noted that capacitors of other designs may be constructed having spaced-apart surfaces formed upon elements other than plates 14 and 18, but which similarly function as charge storage devices.

Positioned between spaced-apart plates 14 and 18 is a material, such as air, of a dielectrical constant value. Various materials, other than air, may be positioned between the spaced-apart plates 14 and 18 which are of various dielectrical constant values.

Figure 2:
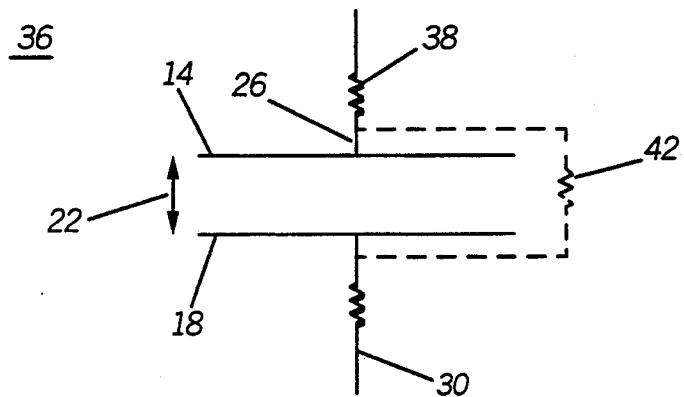
FIG. 2 is a circuit schematic of an actual capacitive element having intrinsic series and parallel resistances associated therewith.

FIG. 2 is a circuit schematic, similar to that of FIG. 1, but illustrating an actual circuit comprised of the capacitor 10 of FIG. 1. The actual capacitor circuit represented in FIG. 2, and referred to generally by reference numeral 36, is comprised not only of plates 14 and 18 spaced-apart by a distance indicated by arrow 22, and leads 26 and 30 coupled to plates 14 and 18, respectively, but, additionally, capacitor circuit 36 includes an effective series resistance, represented by resistor 38, and shunt resistor 42, shown in hatch, and positioned in a parallel connection with plates 14 and 18. Resistor 38, representative of the effective series resistance, is typically of a low value, and resistor 42, representative of the shunt resistance, is typically of a very large value. Because the shunt resistance is typically of such a very large magnitude, the shunt resistance, for practical purposes, forms an open circuit, and need not be considered further.

Because a capacitor functions as a charge storage device, connection of the capacitor, either represented by the ideal capacitor 10 of FIG. 1, or the actual capacitor circuit 36 through resistor 38, across a load element causes discharge of the charge stored upon a surface of one of the plates of the capacitor. Discharge of the capacitor generates a current which, if great enough, can be utilized to operate the load device. Therefore, if the charge stored by a capacitor is great enough, when suitably connected, a capacitor may be utilized to operate any electrical device, such as the radiotelephone, mentioned hereinabove.

Figure 3:
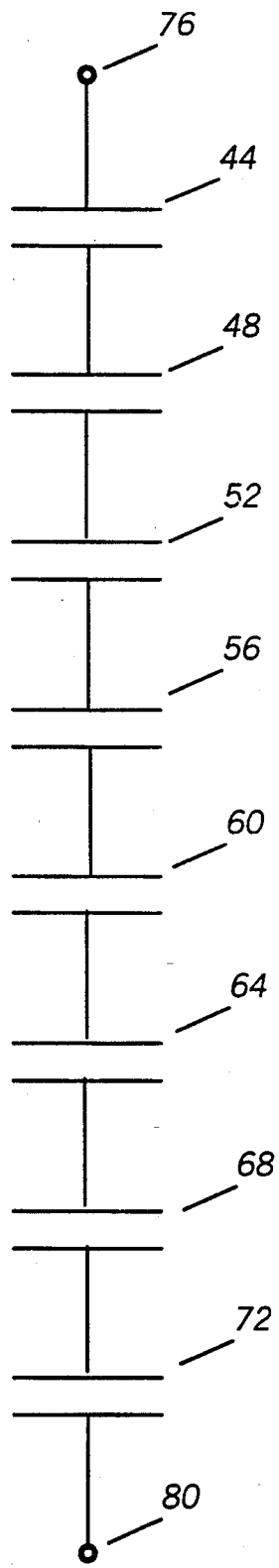
FIG. 3 is an ideal, circuit schematic of the capacitive power supply of a preferred embodiment of the present invention.

FIG. 3 is circuit schematic of eight capacitors 44, 48, 52, 56, 60, 64, 68 and 72 connected in a series connection therebetween. Capacitors 44–72 are similar to capacitor 10 of FIG. 1 and are comprised of spaced-apart surfaces formed upon opposing plates. When a voltage source is connected at nodes 76 and 80 formed on opposite ends of the capacitors 44–72 connected in the series connection as shown, electrical charge is stored upon one plate of each of the capacitors 44–72, thereby causing a potential difference to be formed across the opposing plates of each of the capacitors 44–72. After removal of the voltage source, the electrical charge stored upon the plates of the capacitors 44–72 remains. The potential difference derived therefrom across opposing plates of each of the capacitors 44–72 may be summed there together to indicate the potential difference taken across nodes 76 and 80. By connecting capacitors in a series connection such as the series connection of capacitors 44–72, the resultant potential difference between nodes 76 and 80 is a summation of the potential difference measured across the individual capacitors. By coupling a load element across nodes 76 and 80, discharge of each of the capacitors 44–72 generates a current which is greater than the current generated by the discharge of any one of the capacitors.

Figure 4:
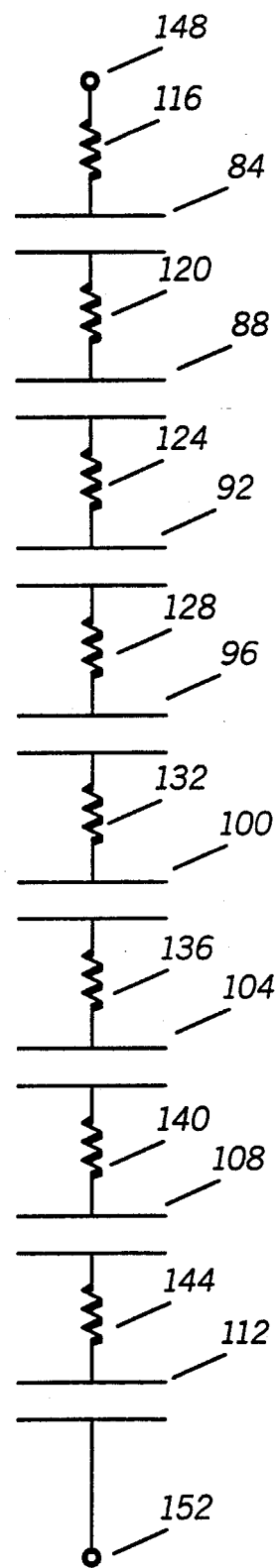
FIG. 4 is a circuit schematic, similar to that of FIG. 3, but illustrating the capacitive power supply of a preferred embodiment of the present invention comprised of actual, capacitive elements having intrinsic series resistances associated therewith.

FIG. 4 is a circuit schematic, similar to that of FIG. 3 wherein eight capacitors, here referred to by reference numerals 84–112, are connected in a series connection. The circuit schematic of FIG. 4 differs from that of FIG. 3 in that the circuit schematic is of a series connection of eight actual capacitor circuits, similar to capacitor circuit 36 of FIG. 2. Therefore, the circuit schematic of FIG. 4 further illustrates resistors of 116, 120, 124, 128, 132, 136, 140 and 144, representative of the effective series resistance associated with each actual capacitor 84–112. Nodes 148 and 152 are formed at opposite ends of the series circuit of FIG. 4. Similar to the series connection of capacitors 44–72 of FIG. 3, capacitors 84–112 function as electrical charge storage devices which, upon connection of a voltage source at nodes 148 and 152, causes electrical charge to be formed upon a surface of one plate of each of the capacitors 84–112. A potential difference is derived therefrom across opposing plates of each capacitor 84–112, and the sum of the potential differences across the plate members of each capacitor 84–112 can be determined to indicate the potential difference across nodes 148–152 (less the voltage drop across each of the resistors 116–144). The potential difference across nodes 148 and 152 is less than the potential difference across nodes 76 and 80 of FIG. 3 as a result of the voltage drop across resistors 116–144 when a load is connected across the respective nodes 76–80 and 148–152.

Figure 5:
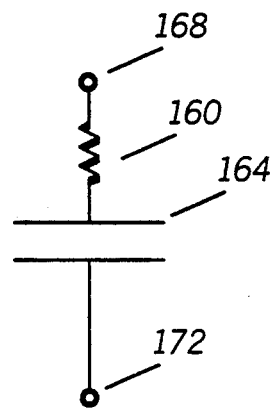
FIG. 5 is an equivalent circuit schematic of the circuit of FIG. 4.

FIG. 5 is a circuit schematic of a circuit equivalent to the circuit of FIG. 4 wherein the value of the resistance of resistor 160 is the sum of the values of resistors 116–144 of FIG. 4. Analogously, the value of the capacitance of capacitor 164 is one divided by the sum of the inverses of the values of the capacitances of capacitors 84–112 of FIG. 4. The potential difference across the plates of capacitor 164 is equivalent to the summation of the potential differences across capacitors 84–112 of FIG. 4. Similarly, the potential difference across nodes 168 and 172 of the circuit schematic of FIG. 5 is the potential difference taken across the plate members of capacitor 164, less the voltage drop across resistor 160. It is to be noted that, while the equivalent circuit of FIG. 5 has been described in connection with the circuit schematic of FIG. 4, the equivalent circuit of FIG. 5 may represent the combination of actual capacitor elements of other numbers, values, and connections therebetween, such as other series or parallel connections of other capacitors, or combinations of each.

Figure 6:
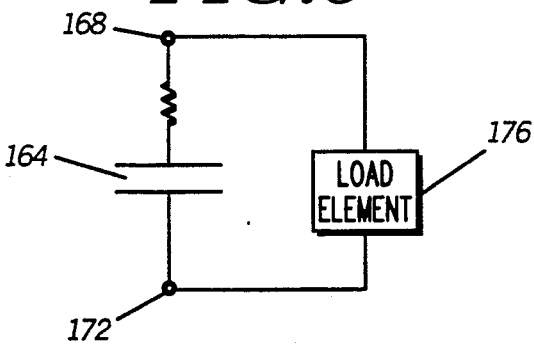
FIG. 6 is a circuit schematic of the capacitive power supply of a preferred embodiment of the present invention positioned to power a load element.

FIG. 6 is a partial circuit schematic, partial block diagram of the equivalent circuit of FIG. 5 connected at nodes 168 and 172 thereof across load element 176. When the electrical charge stored upon one of the plate members of capacitor 164 is above a certain level, discharge of the stored charge occurs, thereby generating a current that may be utilized to power load element 176. A capacitive circuit, similar to the equivalent circuit of FIG. 5, when connected across a load element 176 as shown in FIG. 6, forms the capacitive power supply to power thereby a load element, such as load element 176, according to the teachings of the present invention.

Capacitor designs are now known which are of high capacitive values and which are also of small physical dimensions. In particular, and according to the teachings of the preferred embodiment of the present invention, a capacitor formed of a conductive, ceramic material, and separated by an aqueous electrolyte of a desired dielectric value forms a capacitor of a high capacitance. Such capacitor designs have been disclosed, for example in an article entitled, "Improved Pulse Power Sources With High-Energy Density Capacitor" by H. Lee, G. L. Bullard, G. C. Mason, and K. Kern in the IEEE Transactions on Magnetics v. 25 n. 1, January 1989, pp. 324–330, and an article entitled "Operating Principles of the Ultracapacitor" by G. R. Bullard, H. B. Sierra-Alcazar, H. K. Lee, and J. J. Morris in the IEEE Transactions on Magnetics, v. 25, n. 1, January, 1989, pp. 102–106. Additionally, Canadian Patent No. 1,196,683 by Dwight R. Craig, issued on Nov. 12, 1985, discloses similar capacitor designs and methods for making such capacitor designs. A capacitor comprised of such a conductive, ceramic material, and which are each of areas of approximately forty square centimeters can form a capacitor of a capacitance of approximately 6000 farads having a potential difference across the opposing sides thereof of approximately 1.2 volts. A capacitor having similar properties may also be constructed wherein the dielectric material is comprised of a nonaqueous material or a solid state material.

Connection of eight of such capacitors in a series connection, similar to the connection of the circuit schematic of FIGS. 3 and 4, and represented by the equivalent circuit of FIG. 5, increases the current generative ability of the resultant circuit formed therefrom. A potential difference across opposite ends thereof (as indicated in FIG. 5, across nodes 168 and 172) of approximately 9.6 volts may be obtained from such series connection of eight capacitors.

The equivalent capacitance of eight of such 6000 farad capacitors generates a current of a level, during discharge of the capacitors, great enough to power a radiotelephone, such as the Motorola MICRO T.A.C. 950 PT Personal Cellular Telephone which is commercially available, and which has a nominal input voltage of 6.3 volts and an input voltage operating range between 8.5 volts and 5.2 volts.

Figure 7:
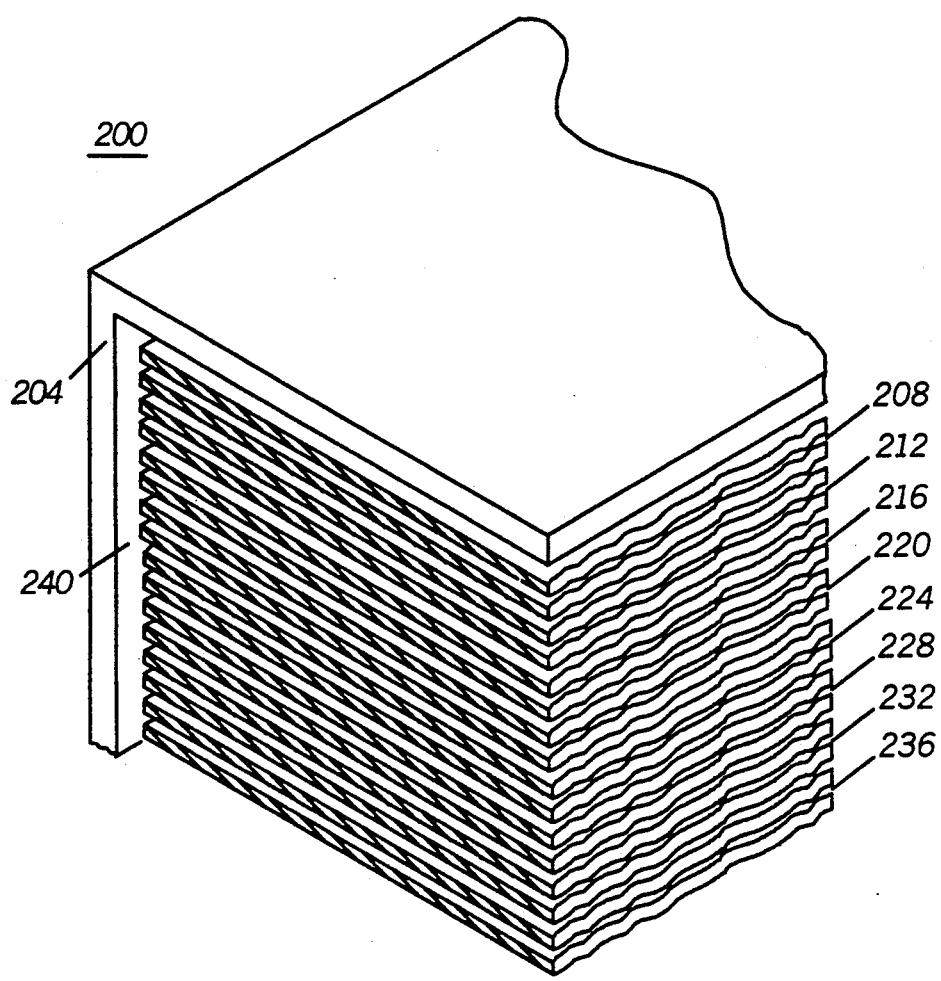
FIG. 7 is a cut-away, schematic view of the capacitive power supply of a preferred embodiment of the present invention.

FIG. 7 is a cut-away, schematic view of a portion of such a capacitive power supply, referred to generally in the Figure by reference numeral 200. Capacitive power supply 200 includes housing 204 which supportively houses eight capacitors 208, 212, 216, 220, 224, 228, 232 and 236. Each capacitor 208–236 is of substantially similar dimensions and construction, namely, each capacitor is comprised of a ceramic, conductive material to provide a relatively thin power source with a nominal voltage of 1.2 volts, and low, intrinsic, series resistance. Separating opposing sides of each capacitor 208–236 is an aqueous electrolyte, indicated by material 240 contained within the internal chamber formed of supportive housing 204.

Figure 7A:
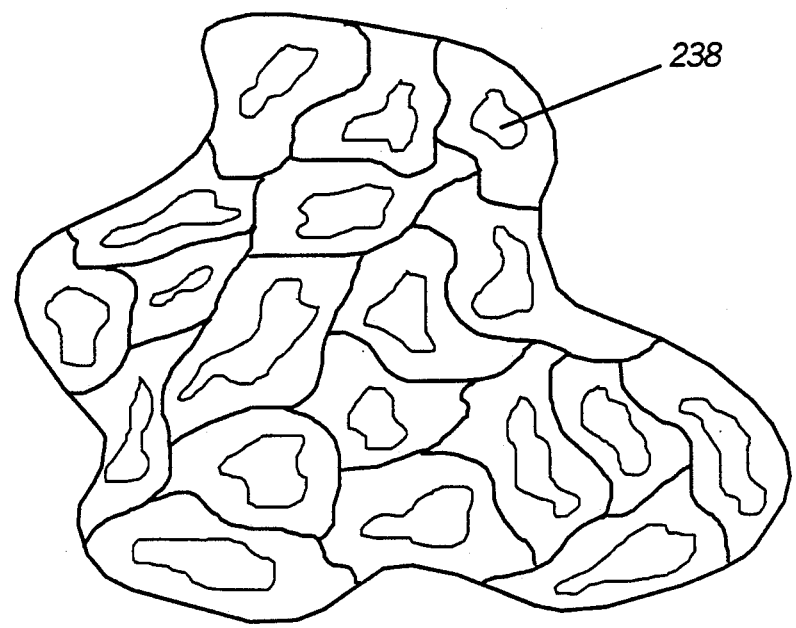
FIG. 7A is an enlarged view of a portion of a single plate of the capacitive power supply of FIG. 7.

The exploded view of FIG. 7A illustrates a portion of a surface of one plate of one capacitor 208–236. As illustrated, the surface is rough, uneven, and sponge-like in appearance. The surface is actually porous, and numerous pores 238 are indicated in the Figure. Such irregular surface increases the surface area formed upon the plates of each of the capacitors 208–236; increases in the actual surface area of each plate, increases the capacitance of the capacitors 208–236 formed therefrom, and is partly responsible for the high-capacitive quality of the resultant capacitor. While not shown in the Figure, capacitors 208–236 are connected in a series connection by a conductive material. Capacitive power supply 200 of FIG. 7 is approximately two inches in height.

Figure 8:
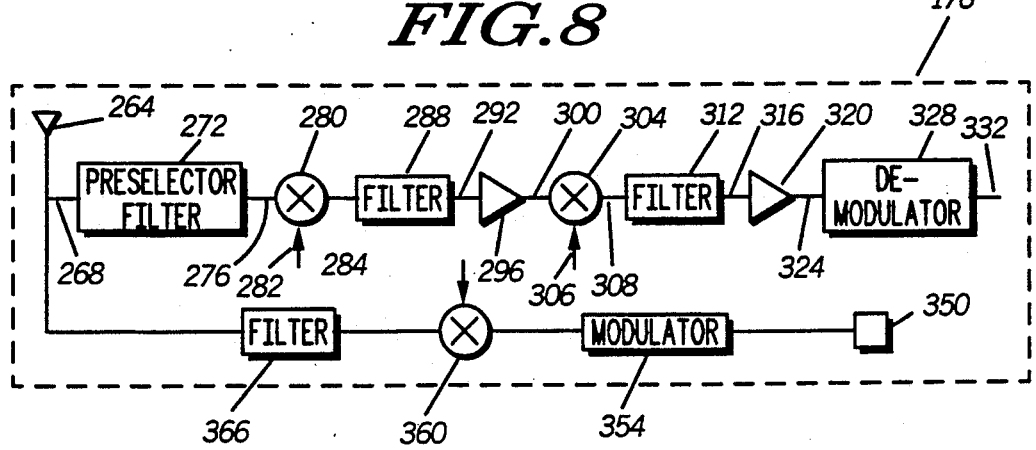
FIG. 8 is a block diagram of a transceiver which may be powered by the capacitive power supply of the present invention.

Turning now to the block diagram of FIG. 8, a radiotelephone, referred to generally by reference numeral 260, constructed according to the teachings of the present invention, is illustrated. Radiotelephone 260 is enclosed by block 176, shown in hatch, which corresponds to load element 176 of FIG. 6. Suitable connection of radiotelephone 260 to nodes 168 and 172 of the equivalent circuit of the capacitive power supply permits powering of the radiotelephone 260 thereby. The actual circuitry embodying the functional blocks of radiotelephone 260 may be disposed upon one or more circuit boards and housed within a conventional radiotelephone housing. A transmitted signal transmitted by, for example, a base station of a cellular, communication system, transmits a signal to antenna 264. Antenna 264 supplies the receive signal on 268 to preselector/filter 272. Preselector/filter 272 is preferably a very wideband filter having a baseband to pass all of the frequencies within a band of interest. Filter 272 generates a filtered signal on line 276 which is supplied to mixer 280. Mixer 280 additionally receives an oscillating signal on line 282 from an oscillator (not shown) which preferably forms a portion of a conventional phase locked loop. Mixer 280 generates a down converted signal (commonly referred to as a first intermediate frequency signal) on line 284 which is supplied to filter 288. Filter 288 is, preferably, a monolithic crystal wideband filter, and is commonly referred to as the first intermediate frequency, i.e., IF filter.

Filter 288 generates a filtered signal on line 292 which is supplied to amplifier 296. Amplifier 296 amplifies the signal supplied thereto on line 292 and generates an amplified signal on line 300. Line 300 is coupled to an input to mixer 304 which also receives an input on line 306 from an oscillator, not shown, (which also preferably comprises a portion of a conventional phase locked loop). Mixer 304 generates a mixed signal on line 308 which is supplied to filter 312. Filter 312 forms a passband of a bandwidth permitting passage of a desired signal on line 316. Line 316 is coupled to an input of amplifier/limiter 320 which generates a voltage limited signal on line 324 which is supplied to demodulator 328. Demodulator 328 generates an output signal on line 332.

The block diagram of FIG. 8 further illustrates a transmit portion of radiotelephone 260 comprising microphone 350, modulator 354, mixer circuit 360 and filter 366, the output of which is coupled to antenna 264.

It is to be noted that the receive portion, i.e., the top portion of the block diagram of FIG. 8, also describes a receiver, such as a radio-pager, which may similarly be powered by the capacitive power supply of the present invention.

Figure 9:
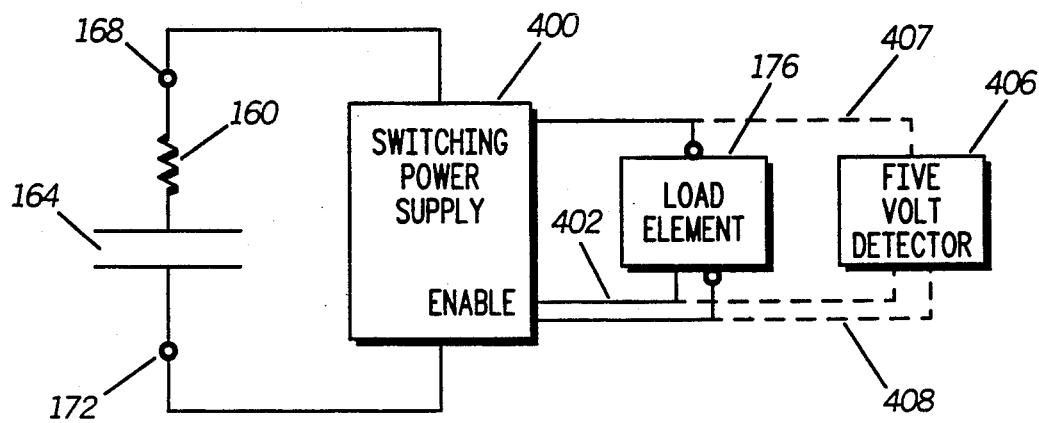
FIG. 9 is a partial block, partial circuit schematic diagram of a further embodiment of the capacitive power supply of the present invention.

Turning now to the partial circuit schematic, partial block diagram of FIG. 9, the capacitive power supply, representative by the equivalent circuit of FIG. 5 is positioned to power load element 176. Positioned between the capacitive power supply and the load element 176 is switching power supply 400. Switching power supplies are well known per se in the art and function to generate a constant voltage output responsive to application of a wide range of voltages across an input thereof. An example of one such switching power supply is Maxim Integrated Products Model No. MAX631 which comprises a CMOS Fixed/Adjustable Output Step-Up Switching Regulator.

Without switching power supply 400, and when the capacitive power supply is coupled across a load element 176 as illustrated in FIG. 6, the charge stored upon one of the plates of the capacitor 164 is discharged as long as the potential difference formed across the plates of capacitor 164 is above a pre-determined, minimum value. Inclusion of the switching power supply as illustrated in FIG. 9, permits discharge of the stored charge of capacitor 164 beneath this pre-determined value.

FIG. 9 further illustrates line 402 connecting an enable input of switching power supply 400 and load element 176. The enable input may be utilized to cause operation of switching power supply 400 only when load element 176 is connected thereto. Alternately, five volt detector 406 is also illustrated in FIG. 9 and connected across load element 176 by lines 407 and 408, shown in hatch, in the Figure may be used to generate the enable input 402 when the voltage across load element 176 falls beneath five volts. Inputs to switching power supply 400 may cause operation of supply 400 only when the voltage across load element 176 is below five volts, to extend, thereby, the operational period of powering of the load element 176 by capacitor 164.

Figure 10A:
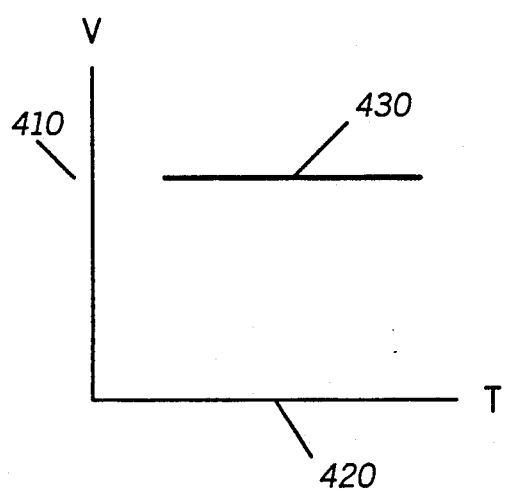
FIG. 10A and 10B are graphical representations of voltages taken across portions of the circuit of the embodiment of FIG. 9.
Figure 10B:
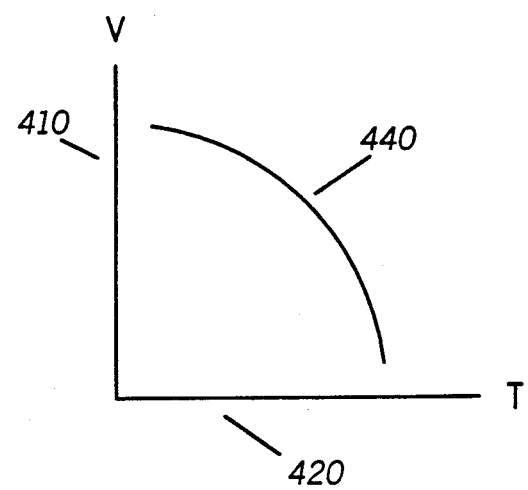

FIGS. 10A and 10B are graphical representations wherein ordinate axes 410 are scaled in terms of volts, and abscissa axes 420 are scaled in terms of seconds. Line segment 430 of FIG. 10A is representative of the voltage taken at the output side of switching power supply 400, and as illustrated, is of a constant voltage. Curve 440 plotted in FIG. 10B is representative of the voltage applied to the input of switching power supply 400 which, for example, is nominally 6.3 volts for the radiotelephone 260 of FIG. 8, and which, in the preferred embodiment, may vary between approximately 1.2 volts and 8.5 volts. Over time, as the remaining charge stored by capacitor 164 decreases, the corresponding voltage across capacitor 164, which is supplied to switching power supply 400, decreases. The inclusion of switching power supply 400 permits powering of load element 176 by the capacitive power supply for an extended period of time. Switching power supply may be disposed with the capacitive power supply and housed within or at the housing of the power supply, such as housing 204 of FIG. 7, or, alternately, switching power supply 400 may be disposed within load element 176.

The capacitive power supply of the present invention may be advantageously utilized to power any electrical device such as a portable radiotelephone, as the capacitive power supply is of small dimensions, may be charged at a very high rate, and is of an unlimited life. Additionally, the capacitive power supply may be permanently affixed to the load element 176, as the unlimited recharging ability of the power supply does not require that a non-permanent power supply, such as a conventional electrochemical battery, be intermittently removed and replaced.

While the present invention has been described in connection with the preferred embodiment shown in the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A portable power supply for powering an electrical load element, said portable power supply having a plurality of capacitors, each capacitor of the plurality of capacitors having; a first surface forming a first energy storage surface comprised of a porous-ceramic, conductive material for collecting and storing electrical charge responsive to application of a charging current thereto, and a second surface forming a second energy storage surface, comprised of a porous-ceramic, conductive material and spaced-apart from the first energy storage surface formed by the first surface whereby a potential difference is formed across the first and the second surfaces, respectively, when the electrical charge is applied to the first and second energy storage surfaces, and wherein the first surface and the second surface spaced-apart therefrom of each capacitor of the plurality of capacitors are together of a low electrical resistance and are separated by an aqueous dielectric, the first and the second surfaces being of the low electrical resistance to minimize, thereby, resistive loss across the first and second surfaces, respectively, during discharge of the electrical charge stored upon the first and second energy storage surfaces, each of the plurality of capacitors formed thereby being connected in a series connection and stacked upon one another wherein a first surface of a first capacitor is coupled to a second surface positioned therebeneath to connect the capacitors of the plurality of capacitors, thereby, in said series connection; and a switching power supply coupled across the plurality of capacitors stacked in the series connection and to the load element, said switching power supply for generating a constant-voltage output signal during discharge of the energy stored upon the first and second energy storage surfaces of the plurality of capacitors to power the electrical load element with the constant-voltage output signal thereby.

2. The portable power supply of claim 1 wherein said first surface of each capacitor of the plurality of capacitors is of elongated lengthwise and widthwise dimensions relative to depthwise dimensions thereof.

3. The portable power supply of claim 1 wherein said second surface of each capacitor of the plurality of capacitors is of elongated lengthwise and widthwise dimensions relative to depthwise dimensions thereof.

4. The portable power supply of claim 1 further comprising a supportive housing for supportively housing the plurality of capacitors therewithin.

5. The portable power supply of claim 1 wherein the switching power supply is operative only during times in which the load element is coupled thereto.

6. The portable power supply of claim 1 wherein the switching power supply is operative during times in which voltage levels across the plurality of capacitors stacked in the series connection are less than a pre-determined value.

7. The portable power supply of claim 1 further comprising a supportive housing for supportively housing the plurality of capacitors and the switching power supply therewithin.

8. The portable power supply of claim 1 wherein the load element comprises a transceiver.

9. A transceiver power supply for carriage with a transceiver to power the transceiver when suitably coupled thereto, said transceiver power supply comprised of a plurality of capacitors, each capacitor of the plurality of capacitors having:

a first surface forming a first energy storage surface of a porous-ceramic, conductive material for collecting and storing electrical charge responsive to application of a charging current thereto;

a second surface forming a second energy storage surface of a porous-ceramic, conductive material and spaced-apart from the first energy storage surface formed by the first surface whereby a potential difference is formed across the first and the second surfaces, respectively, when the electrical charge is applied to the first and second energy storage surfaces, respectively, and wherein the first surface and the second surface spaced-apart therefrom of each capacitor of the plurality of capacitors are together of a low electrical resistance and are separated by an aqueous dielectric, the first and second surfaces being of the low electrical resistance to minimize, thereby, resistive loss across the first and second surfaces, respectively, during discharge of the electrical charge stored upon the first and second energy storage surfaces, each of the plurality of capacitors formed thereby being connected in a series connection and stacked upon one another wherein a first surface of a first capacitor is coupled to a second surface positioned therebeneath to connect the capacitors of the plurality of capacitors, thereby, in said series connection;

a switching power supply coupled across the plurality of capacitors stacked in the series connection and to the transceiver when coupled thereto, said switching power supply for generating a constant-voltage output signal during discharge of the energy stored upon the first and second energy storage surfaces of the plurality of capacitors to power the transceiver when coupled thereto with the constant-voltage output signal thereby; and means forming a supportive housing for supportively housing the plurality of capacitors and the switching power supply therewithin.

10. The transceiver power supply of claim 9 wherein said first surfaces of each of the plurality of capacitors are of elongated lengthwise and widthwise dimensions relative to depthwise dimensions thereof.

11. The transceiver power supply of claim 9 wherein said second surfaces are of elongated lengthwise and widthwise dimensions relative to depthwise dimensions thereof.

12. The transceiver power supply of claim 9 wherein the switching power supply is operative only during times in which the load element is coupled thereto.

13. The transceiver power supply of claim 9 wherein the switching power supply is operative during times in which voltage levels across the plurality of capacitors stacked in the series connection are less than a predetermined value.

14. A portable radiotelephone comprising:

an antenna;

transmit/receive circuitry for receiving signals transmitted to the antenna and for generating signals to be transmitted by the antenna;

means forming a power supply for powering the transmit/receive circuitry when coupled thereto, said power supply having a plurality of capacitors, each capacitor of the plurality of capacitors having; a first surface forming a first energy storage surface comprised of a porous-ceramic, conductive material for collecting and storing electrical charge responsive to application of a charging current thereto, and a second surface forming a second energy storage surface, comprised of a porous-ceramic, conductive material and spaced-apart from the first energy storage surface formed by the first surface whereby a potential difference is formed across the first and the second surfaces, respectively, when the electrical charge is applied to the first and second energy storage surfaces, respectively, and wherein the first surface and the second surface spaced-apart therefrom of each capacitor of the plurality of capacitors are together of a low electrical resistance and are separated by an aqueous dielectric, the first and second energy storage surfaces being of the low electrical resistance to minimize, thereby, resistive loss across the first and second surfaces, respectively, during discharge of the electrical charge stored upon the first and second energy storage surfaces, each of the plurality of capacitors formed thereby being connected in a series connection and stacked upon one another wherein a first surface of a first capacitor is coupled to a second surface positioned therebeneath to connect the capacitors of the plurality of capacitors, thereby, in said series connection; and a switching power supply coupled across the plurality of capacitors stacked in the series connection and to the transmit/receive circuitry, said switching power supply for generating a constant-voltage output signal during discharge of the energy stored upon the first and second energy storage surfaces of the plurality of capacitors to power the transmit/receive circuitry with the constant-voltage output signal thereby.

15. A receiver comprising:

an antenna;

receive circuitry for receiving signals transmitted to the antenna; and means forming a power supply for powering the receive circuitry when coupled thereto, said power supply having a plurality of capacitors, each capacitor of the plurality of capacitors having; a first surface forming a first energy storage surface comprised of a porous-ceramic, conductive material for collecting and storing electrical charge responsive to application of a charging current thereto, and a second surface forming a second energy storage surface, comprised of a porous-ceramic, conductive material and spaced-apart from the first energy storage surface formed by the first surface whereby a potential difference is formed across the first and the second surfaces, respectively, when the electrical charge is applied to the first and second energy storage surfaces, and wherein the first surface and the second surface spaced-apart therefrom of each capacitor of the plurality of capacitors are together of a low electrical resistance and are separated by an aqueous dielectric, the first and second energy storage surfaces being of the low electrical resistance to minimize, thereby, resistive loss across the first and second surfaces, respectively, during discharge of the electrical charge stored upon the first and second energy storage surfaces, each of the plurality of capacitors formed thereby being connected in a series connection and stacked upon one another wherein a first surface of a first capacitor is coupled to a second surface positioned therebeneath to connect the capacitors of the plurality of capacitors, thereby, in said series connection; and a switching power supply coupled across the plurality of capacitors stacked in the series connection and to the receive circuitry, said switching power supply for generating a constant-voltage output signal during discharge of the energy stored upon the first and second energy storage surfaces formed of the plurality of capacitors to power the receive circuitry with the constant-voltage output signal thereby; and means forming a supportive housing for supportively housing means forming the power supply therewithin.

* * * * *